(12) United States Patent
Yadhav et al.

(10) Patent No.: US 11,140,594 B2
(45) Date of Patent: Oct. 5, 2021

(54) METHODS AND SERVICE NODES FOR TRANSFERRING A SERVICE SESSION FOR A WIRELESS DEVICE

(71) Applicant: Telefonaktiebolaget LM Ericsson (publ), Stockholm (SE)

(72) Inventors: Vinay Yadhav, Upplands Väsby (SE); Jonas Pettersson, Luleå (SE); Amir Roozbeh, Kista (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 51 days.

(21) Appl. No.: 16/499,749

(22) PCT Filed: Apr. 21, 2017

(86) PCT No.: PCT/SE2017/050393
§ 371 (c)(1),
(2) Date: Sep. 30, 2019

(87) PCT Pub. No.: WO2018/194497
PCT Pub. Date: Oct. 25, 2018

(65) Prior Publication Data
US 2021/0105682 A1    Apr. 8, 2021

(51) Int. Cl.
*H04W 36/00* (2009.01)
*H04W 36/02* (2009.01)
(Continued)

(52) U.S. Cl.
CPC ......... *H04W 36/023* (2013.01); *H04L 67/148* (2013.01); *H04W 36/08* (2013.01)

(58) Field of Classification Search
CPC .... H04W 36/023; H04W 36/18; H04L 67/148
See application file for complete search history.

(56) References Cited

U.S. PATENT DOCUMENTS

| | | | |
|---|---|---|---|
| 8,818,375 B2 * | 8/2014 | Meyer | H04W 36/02 |
| | | | 455/436 |
| 9,998,958 B2 * | 6/2018 | Backlund | H04W 36/02 |

(Continued)

FOREIGN PATENT DOCUMENTS

| | | |
|---|---|---|
| EP | 2742954 A1 | 7/2012 |
| WO | 2011032732 A1 | 3/2011 |
| WO | 2015084230 A1 | 6/2015 |

OTHER PUBLICATIONS

International Search Report and Written Opinion for Application No. PCT/SE2017/050394, dated Oct. 20, 2017, 14 pages.
(Continued)

*Primary Examiner* — Khai M Nguyen
(74) *Attorney, Agent, or Firm* — Nicholson De Vos Webster & Elliott LLP

(57) ABSTRACT

Source and target service nodes and methods are described, for transferring a service session for a wireless device from the source node to the target node when the wireless device is handed over from a first base station associated with the source node to a second base station associated with the target node. A first data amount indication is obtained, which indicates how much downlink data is pending at the first base station. The first base station is requested to delete some or all pending downlink data from a downlink buffer, and the source node transfers to the target node application data and a data amount indication related to a first data amount indication. The target node can then recreate the downlink buffer at the second base station by sending a first part of the application data, corresponding to the second data amount indication, to the second base station.

26 Claims, 6 Drawing Sheets

(51) Int. Cl.
  *H04L 29/08*    (2006.01)
  *H04W 36/08*    (2009.01)

(56) References Cited

U.S. PATENT DOCUMENTS

| | | | |
|---|---|---|---|
| 2010/0067483 A1* | 3/2010 | Ahluwalia | H04L 1/1671 |
| | | | 370/331 |
| 2011/0116470 A1* | 5/2011 | Arora | H04W 36/0083 |
| | | | 370/331 |
| 2014/0286254 A1 | 9/2014 | Agiwal et al. | |
| 2016/0255543 A1* | 9/2016 | Yadhav | H04L 67/148 |
| | | | 370/331 |
| 2016/0381699 A1* | 12/2016 | Rubin | H04L 67/2809 |
| | | | 370/329 |
| 2017/0118744 A1* | 4/2017 | Harris | H04W 36/22 |

OTHER PUBLICATIONS

International Search Report and Written Opinion for Application No. PCT/SE2017/050393, dated Dec. 21, 2017, 10 pages.
Nokia et al., "Solution for Session Continuity" 3GPP Draft; S2-162527-SESSIONCONTINUITY, 3rd Generation Partnership Project (3GPP), Mobile Competence Centre, vol. SA WG2, Nanjing, P.R. China; May 23, 2016-May 27, 2016, May 23, 2016 (May 23, 2016), XP051109285, Retrieved from the Internet: URL:http://vww.3gpp.org/ftp/Meetings_3GPP_SYNC/SA2/Docs/ [retrieved on May 23, 2016], Paragraph 11 "Scenario 311".

\* cited by examiner

METHODS AND SERVICE NODES FOR TRANSFERRING A SERVICE SESSION FOR A WIRELESS DEVICE

CROSS-REFERENCE TO RELATED APPLICATIONS

This application is a National stage of International Application No. PCT/SE2017/050393, filed Apr. 21, 2017, which is hereby incorporated by reference.

TECHNICAL FIELD

The present disclosure relates generally to a source service node, a target service node and methods therein, for transferring a service session for a wireless device from the source service node to the target service node.

BACKGROUND

In this disclosure, the term "wireless device" is used to represent any communication entity capable of radio communication with a network node of a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which could be used herein as a synonym for wireless device.

The wireless network typically comprises a number of network nodes which are operable to communicate radio signals with wireless devices over a radio interface. Depending on the type of network and terminology used, a network node of a wireless network may be referred to as a base station, radio node, Node B, eNodeB, gNodeB, base transceiver station, access point, etc. In this disclosure, the term "base station" is used to represent such a network node without limitation to any particular type of wireless network.

Further, the term "service node" is used herein to represent any functional network entity that is operable to provide one or more service sessions for a wireless device by sending application data to the wireless device via a base station of a wireless network. Such application data may be related to any services that can be provided for wireless devices, e.g. streaming or downloading of various media content such as music, images, movies, web pages and gaming, although this disclosure is not limited to any particular application data or services. This communication of data to a wireless device may typically involve considerable amounts of data that is first generated or otherwise obtained at the service node and then sent to the base station currently serving the wireless device for transmission over a radio interface between the base station and the wireless device. The data sent from the service node will be referred to as "application data" and data transmitted from the base station will be referred to as "downlink data" which thus comprises the application data.

It has been recognized that by using a service node that is located relatively close to the wireless device, any latency and delays in the service delivery can be reduced basically by making the communication path as short as possible, as compared to using a central server that could be located anywhere on the Internet. As the application data becomes available at the service node, the data is placed in a queue referred to as an application buffer from which the data is sent towards the base station in suitable packets or the like. Typically, the data is kept in the application buffer until an acknowledgement is received from the wireless device which confirms that the data, e.g. in a data packet, has been received correctly. If no such positive acknowledgement is received the data may have to be resent which may be repeated until the required acknowledgement is received, or until a timeout expires which may indicate that the data has become "out of date", i.e. more or less useless to the wireless device.

The above-described service node may be implemented in a "cloud-like" environment meaning that resources for processing, storing and communication of data are basically hired, hosted or rented and used temporarily for the service delivery. When the service session is finished, the used resources in the service node are released and become available for other services and devices, which is well known in the field of cloud computing. Multiple such service clouds or service nodes may be deployed locally, e.g. at the base stations themselves or closely connected thereto, sometimes referred to as "Local Service Clouds", LSCs. This way, a dedicated communication link can be used between the service node and the serving base station to minimize the latency and delays. An example of how a Local Service Cloud could be realized is as a set of physical computers, e.g. servers, on which a number of so-called virtual machines are created on which applications and application sessions can be executed. The virtual machines may in turn be implemented by software emulating physical computers or servers.

The downlink data is typically communicated according to a Packet Data Convergence Protocol, PDCP, and/or a Radio Link Control, RLC, protocol, e.g. when Long Term Evolution, LTE, is employed. Still, some delay will occur since the data is first buffered in the service node's application buffer, e.g. a Transmission Control Protocol (TCP) buffer, and then in a downlink buffer in the base station, e.g. a PDCP buffer, before it is finally transmitted to the wireless device. Each buffering causes delay before the data can finally reach the wireless device.

To enable mobility during an ongoing service session, the wireless device may need to be handed over from one base station to another base station which are connected to different service nodes, e.g. LSC service nodes. This requires also that the service session is transferred from one corresponding source node to another, which is illustrated in FIG. 1.

In this example, a wireless device 100 is initially served by a first base station 102 to which a service node 104 is associated, e.g. connected, that provides the service session for the wireless device 100, here denoted LSC source service node 104. A service application, APP, is thus executed in the source service node 104 for the wireless device 100 by means of the ongoing service session involving transmission of application data from the service application to the wireless device 100 via a serving base station. At some point during the service session, the wireless device 100 is handed over from base station 102 to a second base station 106 to which another service node 108 is associated/connected, here denoted LSC target service node 108.

In order to retain a short communication path for the data, the service session needs to be transferred from the source service node 104 to the target service node 108 as well, which is done by transferring application data that is pending in the source service node 104 to the target service node 108, e.g. over an S1 interface, or possibly over an X2 interface, depending on the implementation. In this description, application data may comprise content data as well as application state information. Thereby, the service session can be resumed and the service application, APP can be executed in the target service node 108 by sending the pending application data to the second base station 106 for transmission to the wireless device 100. In addition, the handover procedure includes transferring pending downlink data from the first base station 102 to the second base station 106, which is typically done over an interface between base stations, which in LTE is denoted the X2 interface. It is generally desirable that such a handover should go unnoticed by a user of the wireless device 100, meaning that any reception of downlink data should continue in a more or less seamless manner, i.e. without noticeable delay or disturbance in the service.

However, it is a problem that the amount of data traffic generated by the above-described communication may be considerable which causes additional delays in the service and load on the network(s) involved. The transfer of application data between the service nodes and of downlink data between the base stations is often time-consuming so that the service session may be notably disturbed and even interrupted, naturally degrading the user experience. In addition, transfers of large amounts of data create load the transport network connections, which may lead to high transport costs and may further require transport network connections with higher capacity to be deployed, resulting in further costs.

SUMMARY

It is an object of embodiments described herein to address at least some of the problems and issues outlined above. It is possible to achieve this object and others by using a source service node, a target service node and methods therein, as defined in the attached independent claims.

According to one aspect, a method is performed by a source service node for transferring a service session for a wireless device from the source service node to a target service node when a service application is executed in the source service node for the wireless device by means of said service session. In this method, the source service node detects that the wireless device will be handed over from a first base station associated with the source service node to a second base station associated with the target service node.

Upon detecting the forthcoming handover, the source service node also obtains from the first base station a first data amount indication indicating an amount of downlink data pending in a downlink buffer at the first base station for the service session, and requests the first base station to delete at least some of said amount of pending downlink data from the downlink buffer in the first base station. The source service node further transfers to the target service node buffered application data from an application buffer at the source service node and a second data amount indication related to the first data amount indication. Thereby, the target service node is enabled to recreate the downlink buffer at the second base station by sending a first part of the application data which corresponds to the second data amount indication to the second base station.

According to another aspect, a source service node is arranged to transfer a service session for a wireless device from the source service node to a target service node when a service application is executed in the source service node for the wireless device by means of said service session. The source service node is configured to detect that the wireless device will be handed over from a first base station associated with the source service node to a second base station associated with the target service node.

The source service node is also configured to obtain from the first base station a first data amount indication indicating an amount of downlink data pending in a downlink buffer at the first base station for the service session, and to request the first base station to delete at least some of said amount of pending downlink data from the downlink buffer in the first base station.

The source service node is further configured to transfer to the target service node application data from an application buffer at the source service node and a second data amount indication related to the first data amount indication, thereby enabling the target service node to recreate the downlink buffer at the second base station by sending a first part of the application data which corresponds to the second data amount indication to the second base station.

According to another aspect, a method is performed by a target service node for transferring a service session for a wireless device from a source service node to the target service node when a service application is executed in the source service node for the wireless device by means of said service session. In this method, the target service node detects that the wireless device will be handed over from a first base station associated with the source service node to a second base station associated with the target service node.

The target service node further receives from the source service node buffered application data from an application buffer at the source service node and a data amount indication related to an amount of downlink data pending in a downlink buffer at the first base station for the service session. Then the target service node recreates the downlink buffer at the second base station by sending a first part of the received application data which corresponds to the data amount indication to the second base station, and resumes the service session by sending a not yet sent part of the received application data to the second base station for transmission to the wireless device.

According to another aspect, a target service node is arranged to transfer a service session for a wireless device from a source service node to the target service node when a service application is executed in the source service node for the wireless device by means of said service session. The target service node is configured to detect that the wireless device will be handed over from a first base station associated with the source service node to a second base station associated with the target service node.

The target service node is further configured to receive from the source service node application data from an application buffer at the source service node and a data amount indication related to an amount of downlink data pending in a downlink buffer at the first base station for the service session.

The target service node is also configured to recreate the downlink buffer at the second base station by sending a first part of the received application data which corresponds to the data amount indication to the second base station, and to resume the service session by sending a not yet sent part of the received application data to the second base station for transmission to the wireless device.

The above methods and service nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
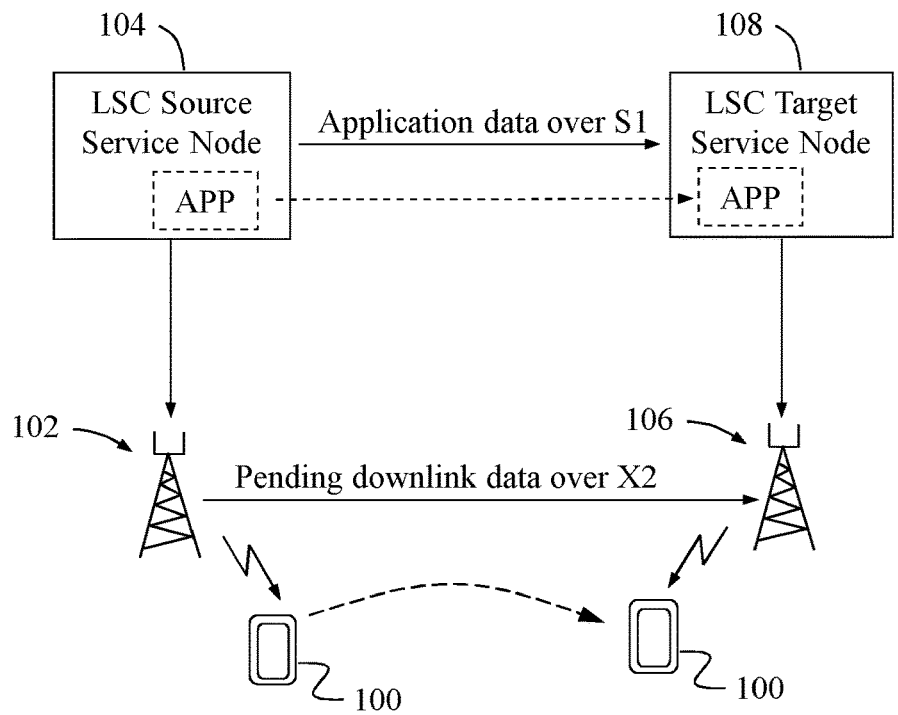
FIG. 1 is a communication scenario illustrating how a service session is transferred from one service node to another, according to the prior art.

Briefly described, a solution is provided to reduce the amount of data that needs to be transferred in order to maintain a service session for a wireless device that is handed over from a first base station associated with a source service node to a second base station associated with a target service node. This can be achieved by identifying downlink data that is pending in a downlink buffer at the first base station which data will be transferred as application data from the source service node to the target service node anyway, and requesting the first base station to delete at least some of the pending downlink data to avoid duplication of transferred data. The source service node then sends the application data and a data amount indication that is related to the pending downlink data, to the target service node.

Thereby, the target service node is able to recreate the downlink buffer at the second base station from the application data based on the received data amount indication. The amount of downlink data to transfer between the base stations is thus reduced by the above deletion of downlink data at the first base station, thereby also reducing any delays in the service caused by this migration of application data as well as reducing the load on the network.

As indicated above, the term "application data" is used herein to generally denote any data or information that is communicated from a service node to a wireless device when a service is executed for the wireless device by the service node. Other suitable terms that could be used in this description instead of application data may include "session data", "service data" and "application context data". For example, the application data may include data associated with the service session itself and data associated with a user context. As already mentioned above, data transmitted from the base station to the wireless device over radio is referred to as "downlink data".

The solution will be described herein basically in the context of LTE and using associated terminology. However, the solution is applicable also in other mobile communication systems, e.g. evolved LTE versions and/or 5G systems, such as the 5G system currently being standardized by 3GPP. In 3GPP's future 5G system the radio access network is referred to as "New Radio" (NR) and the core network may be either the "Evolved Packet Core" (EPC) or a new core network referred to as "Next Generation Core" (NGC). The NR entity corresponding to a base station denoted eNodeB in LTE, e.g. a radio base station, would be referred to as gNB.

Further, various examples and embodiments will be described with reference to the Transmission Control Protocol, TCP which is typically used on the transport layer for service related communication between a service node and a wireless device. The solution may however be applied also when other transport layer protocols are used, such as the Stream Control Transmission Protocol, SCTP or the Quick UDP (User Datagram Protocol) Internet Connections, QUIC.

It was described above with reference to FIG. 1 that when such a handover and migration of an ongoing service session is made in a conventional procedure, all pending application data needs to be transferred from the source service node to the target service node and all pending downlink data also needs to be transferred from the source base station to the target base station, which may cause considerable delay and disturbance in the service. In this solution it has been recognized that the above transfer of application data and downlink data results in duplication of data, i.e. the same data is transferred both between the service nodes and between the base stations. Further, if the session migration is synchronized with the handover, which is often the case e.g. when Long Term Evolution LTE is employed, this delay may compromise the reliability of the handover, meaning that the risk for handover failure increases and may become significant. The above duplication of transferred data can be avoided or at least reduced as follows.

Figure 2:
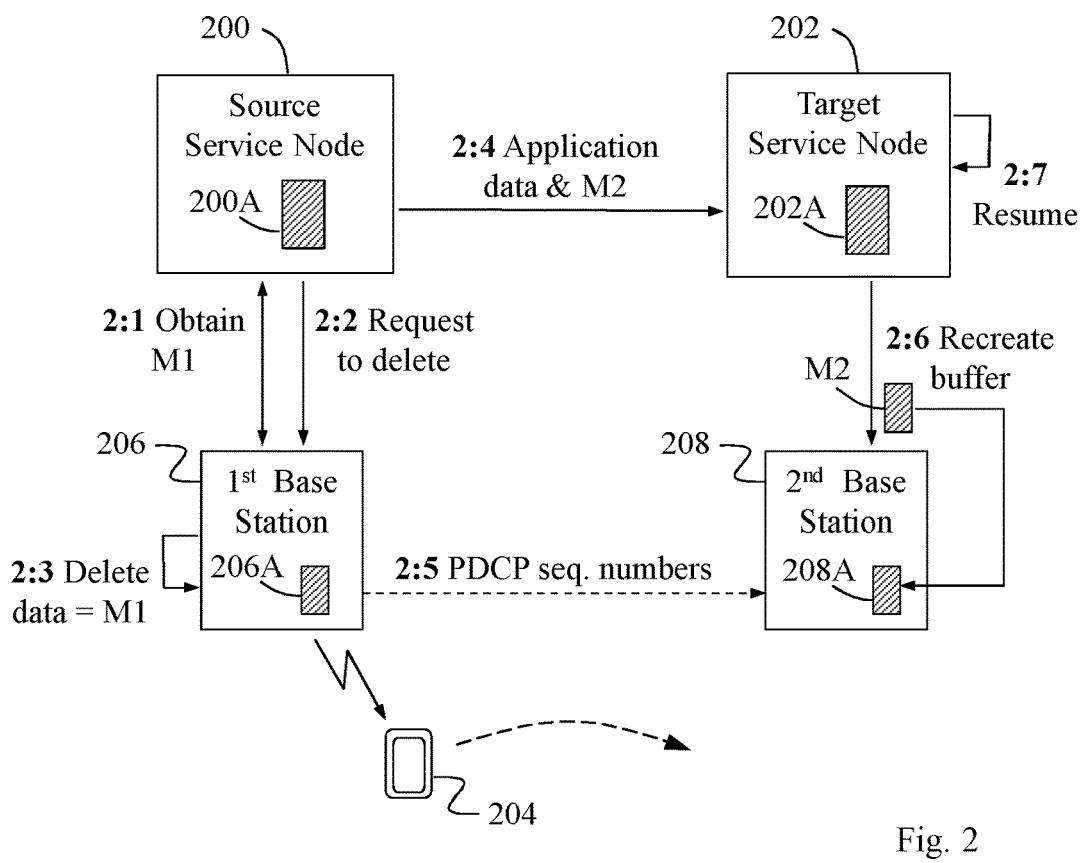
FIG. 2 is a communication scenario illustrating an example of how the solution may be employed for transferring a service session, according to some possible embodiments.

An example of a procedure where the above reduction of transferred and duplicated data may be accomplished will now be described with reference to the scenario in FIG. 2 involving a source service node 200, a target service node 202 and a wireless device 204 which makes a handover from a first base station 206 associated with the source service node 200 to a second base station 208 associated with the target service node 202. Alternatively, the first base station 206 may be denoted a source base station and the second base station 208 may be denoted a target base station.

When detecting that the wireless device 204 is about to be handed over, the source service node 200 obtains a first data amount indication "M1" from the first base station 206, in an action 2:1, where M1 indicates an amount of downlink data pending in a downlink buffer such as a PDCP buffer 206A at the first base station 206 for the service session. The handover may be detected by receiving a suitable handover notification or the like from the first base station 206 which indicates that a handover decision has been taken for the wireless device 204.

In particular, M1 refers to an amount of data which is related to application session(s) hosted by the source service node 200, which may be associated with certain data flow parameters, such as source and destination IP addresses and source and destination transport layer protocol ports, or certain bearers. For example, M1 may indicate a number of bytes or bits, or a number of IP (Internet Protocol) packets or TCP segments, that are pending in the PDCP buffer 206A. The solution is not limited to any particular way of indicating the data amount M1 in this action. Here, the PDCP buffer 206A is used as a non-limiting example of a downlink buffer, although the solution and embodiments described herein are applicable regardless of which protocol is used for the downlink radio communication with device 204.

When the base station indicates to the source service node 200 that the wireless device will be handed over, the base station 206 may in action 2:1 (proactively) send the data amount indication M1 to the source service node 200, i.e. without waiting for an explicit request from the source service node 200.

The pending downlink data in the PDCP buffer 206A typically comprises both data that has not yet been transmitted from the base station 206 and data that has been transmitted but is not yet acknowledged by the wireless device 204. The latter data is kept in the PDCP buffer 206A in case no positive acknowledgment of reception is received from the device and therefore may need to be retransmitted or discarded and indicated as lost. As mentioned above, any transmitted data is removed from the PDCP buffer 206A once a positive acknowledgment is received for that data, or when a timeout expires for unacknowledged downlink data indicating that it has become out of date.

In the same manner, application data pending in an application buffer 200A at the source service node 200, e.g. a TCP buffer, likewise comprises both data that has not yet been dispatched to the base station 206 for transmission to the wireless device 204 and data that has been dispatched but is not yet acknowledged by the wireless device 204. The latter dispatched (i.e. sent) data may need to be sent again to the base station 206 in case no acknowledgment of reception is received from the device 204, which data is therefore kept in the application buffer 200A until a positive acknowledgment is received or a timeout expires for unacknowledged application data. Hence, buffer control based on acknowledgements of received data is typically implemented on two levels, the application level at the service node and the radio transport level at the base station.

In a next action 2:2, the source service node 200 requests the first base station 206 to delete at least some of the amount of pending downlink data from the downlink buffer 206A. Accordingly, any pending downlink data corresponding to M1, which may include both not yet transmitted downlink data and transmitted but unacknowledged downlink data, is removed from the downlink buffer 206A at the first base station 206, as shown in another action 2:3. It is thus assumed in this solution that data corresponding to M1 can be safely omitted from transfer between the base stations 206, 208 by knowing that the same data will be transferred between the service nodes 200, 202 which data can thus be used for recreating the same downlink buffer at the second base station 208, to be described below. In other words, the data corresponding to M1 is thus effectively redundant in the downlink buffer 206A and therefore not necessary to transfer in addition to the data transferred on the application level.

In a further action 2:4, the source service node 200 then transfers the application data together with a second data amount indication M2 to the target service node 202, where the second data amount indication M2 is related to the first data amount indication M1. This means basically that the source service node 200 derives M2 from the obtained M1. It can be said that M1 indicates how much data there is currently in the downlink buffer 206A while M2 indicates how much data the target service node 202 should transfer to the second base station for recreation of the downlink buffer 208A therein. As similar to M1, M2 may e.g. indicate a number of bytes or bits, or a number of IP (Internet Protocol) packets or TCP segments. The solution is not limited to any particular way of indicating the data amount M2 in this action which may be the same way as M1 or different, to be exemplified later below.

Regarding the terminology used in this description, the term "first data amount indication" could be replaced by the term "buffer indicator" or similar, and in that case the term "second data amount indication" could be logically replaced by just "data amount indication".

In one example, M2 may be equal to M1, e.g. in case the entire amount of downlink data pending in buffer 206A is deleted such that no downlink data will be transferred to the second base station 208 on the radio transport level. In this case, the downlink buffer must be recreated entirely from application data transferred to the target service node 202 on the application level. M2 and M1 may also be equal or different depending on whether the data amount is indicated in the same way or not. As an illustrative but non-limiting example, M1 may indicate a number of TCP segments while M2 may indicate a number of bits, or vice versa, which would make M1 and M2 different even though they could refer to the same data amount.

In another example, M2 may indicate a smaller data amount than M1 and in this case the first base station 206 may be requested to delete not all but just some of the amount of pending downlink data from the downlink buffer 206A, which was also indicated above for action 2:2. In this case, M2 only needs to indicate the downlink data that was deleted while M1 indicated the entire amount of downlink data pending in buffer 206A, hence M2 indicates a smaller data amount than Some further illustrative but non-limiting examples of how the second data amount indication M2 may be related to the first data amount indication M1, will be described later below. The solution is however not limited to any of the above and below described examples of how M1 and M2 may related.

In parallel to action 2:4, one or more PDCP sequence numbers referring to the remaining downlink data pending in the PDCP buffer 206A at the first base station 206 after deletion of the requested amount may be transferred to the second base station 208 to which the wireless device 208 will be handed over, as shown in an optional action 2:5. It is thus not necessary to transfer the downlink data deleted in the PDCP buffer 206A from the first base station 206 to the second base station 208, as customarily performed according to regular handover procedures, since this downlink buffer can be recreated at the second base station 208 as follows. Thereby, the communication of data between the base stations is considerably reduced.

The application data transferred in action 2:4 may basically comprise pending data that has not yet been sent from the source service node 200 and possibly also some data that has been sent but not yet acknowledged. By deleting at least some of the pending data from the PDCP buffer 206A as requested in action 2:2, it is possible to avoid or at least reduce communication of redundant data, i.e. the same data twice namely both between the service nodes 200, 202 and between the base stations 206, 208. It should be noted that when the PDCP buffer and data therein is mentioned herein, this refers to data related to the service application that is executed in the source service node for the wireless device 204, while there may be other data buffered in the PDCP buffer entity as well which is not related to the service application, e.g. data buffered for a different bearer.

Having received the application data and the second data amount indication M2 in action 2:4, the target service node 202 is able to operate as follows. A next action 2:6 indicates that the target service node 202 recreates the downlink buffer 208A at the second base station 208 by sending a part of the application data which corresponds to M2 to the second base station 208. This application data thus effectively forms the downlink buffer 208A at the second base station 208, possibly together with other service application related data that has been transferred between the base stations. As a result, downlink buffer 208A is equal to downlink buffer 206A so that the transmission of data to device 204 can continue in a seamless manner, i.e. without any loss or disruption of data but perhaps after a slight pause which may go unnoticed by the device user. An example of how transferred application data can be used to recreate a downlink buffer at the second base station, will be described in more detail below with reference to FIG. 5.

As an alternative to using the PDCP layer as described above, the application data at the TCP/IP layer yet to be acknowledged by the wireless device 204 may be buffered also in the RLC layer at the first base station 206. In this embodiment, the source service node 200 will obtain the data amount indication M1 from the RLC layer instead of from the PDCP layer.

An example will now be described, with reference to the flow chart in FIG. 3, of how the solution may be employed in terms of actions which may be performed by a source service node such as the above-mentioned source service node 200. Some optional example embodiments that could be used in this procedure will also be described below. Reference will also be made, without limiting the described features and embodiments, to the example scenario of FIG. 2. This procedure may be employed in a wireless network which may be of any type and any suitable protocols and standards for communication may be employed in this network.

The source service node 200 in this procedure is arranged to transfer a service session for a wireless device 204 from the source service node 200 to a target service node 202 when a service application is executed in the source service node 200 for the wireless device 204 by means of said service session. In this service session, executing the service application means that the wireless device 204 receives a data flow. For example, in radio communication between base stations and the wireless device 204, the PDCP and/or the RLC protocol may be used although the solution is not limited thereto.

A first action 300 illustrates that the source service node 200 detects that the wireless device 204 will be handed over from a first base station 206 associated with the source service node 200 to a second base station 208 associated with the target service node 202. This detection may be achieved by receiving a suitable handover notification or the like from the first base station 206, as also explained above for action 2:1. Generally, a serving base station typically detects a trigger for handover, e.g. based on measurement reports from the wireless device referring to radio channel quality in one or more neighboring cells/base stations and the current cell/base station. The base station then in turn notifies the service node.

In a next action 302, the source service node 200 obtains a first data amount indication M1 indicating an amount of downlink data pending at the first base station 206 for the service session, which corresponds to action 2:1 above. As mentioned above, the pending downlink data may include not yet transmitted downlink data and transmitted but unacknowledged downlink data. This action may be performed by requesting, from the first base station 206, an indication of the amount of data in a PDCP buffer 206A that a PDCP entity in base station 206 has received from the source service node 200 for the data flow. It is also possible that the base station 206 "proactively" sends M1 to the source service node 200 anyway, that is without needing a request therefrom, e.g. together with a handover notification.

In a following action 304, the source service node 200 requests the first base station 206 to delete at least some of said amount of pending downlink data from the downlink buffer 206A in the first base station 206. This means that the first base station 206 will remove the pending downlink data corresponding to M1 from its downlink buffer 206A. If the service session involves multiple data flows, possibly using different bearers, the request for deletion as of action 304 may be performed for all data flows, e.g. jointly in a single integrated operation.

A final action 306 illustrates that the source service node 200 transfers the buffered application data, possibly including application state information, and a second data amount indication M2 to the target service node 202, which corresponds to action 2:4 above, where M2 is related to the first data amount indication M1. Some examples of how M2 and M1 may be related have been mentioned above and will be further described later below. Thereby, the target service node 202 is enabled to recreate the downlink buffer 208A at the second base station 208 by sending a first part of the transferred application data which corresponds to the second data amount indication M2 to the second base station 208. In other words, the downlink buffer 208A can be recreated from the first part of the application data. An example of how this could be done will be described in more detail with reference to FIG. 5 below. If the service session involves multiple data flows, the transfer of buffered application data, possibly including application state information, and M2 to the target service node 202 may include data for all data flows together and a first data amount indication M2-$n$ for each flow n, which could all be transferred jointly in a single integrated operation.

Figure 3:
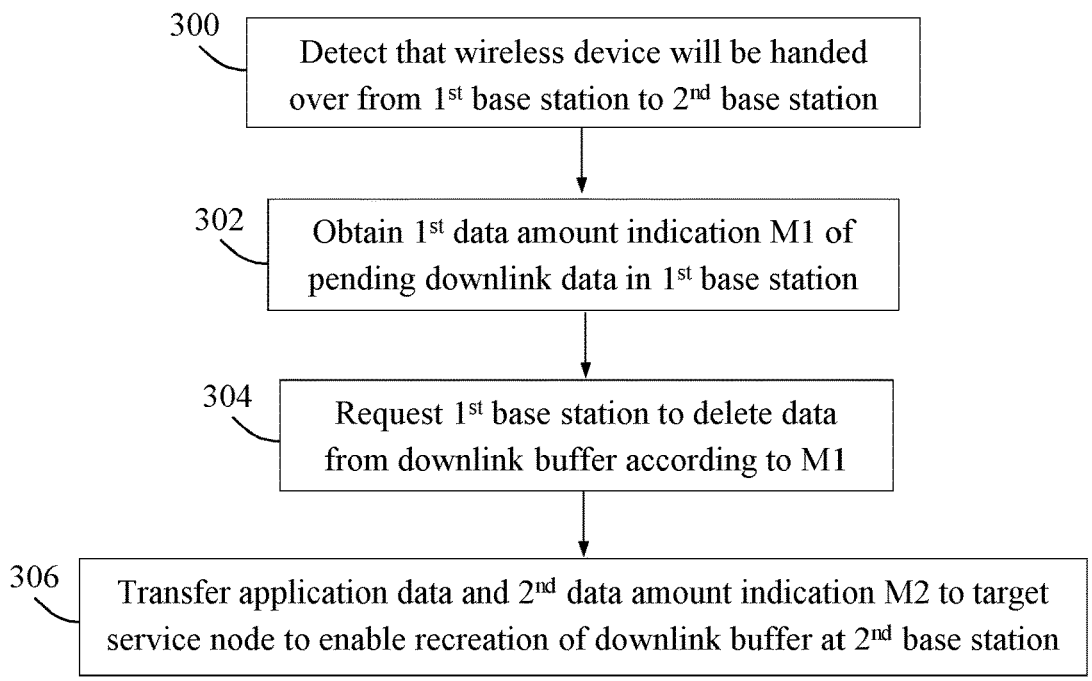
FIG. 3 is a flow chart illustrating a procedure in a source service node, according to further possible embodiments.

Some further embodiments and examples of how the above procedure in FIG. 3 may be realized, will now be outlined. In one example embodiment, the first part of the application data may comprise application data that has been sent from the source service node 200 but not yet acknowledged by the wireless device 204, referred to as unacknowledged sent data. In another example embodiment, said first part of the application data may comprise new unacknowledged application data in the application buffer 200A at the source service node 200 that has been sent from the source service node 200 later than a second part of unacknowledged application data in the application buffer 200A. This embodiment is basically applied in FIG. 5 to be described below. The terms "new" and "old" application data are used in the sense that the new application data has been generated or obtained more recently than the old application data.

In another example embodiment, the pending downlink data at the first base station 206 may, as likewise mentioned above, comprise downlink data that has not yet been transmitted to the wireless device 204 and downlink data that has been transmitted to the wireless device 204 but is not yet acknowledged.

In further example embodiments, either of the first and second data amount indications M1, M2 may indicate at least one of: a number of IP packets, a number of Transmission Control Protocol TCP segments, a number of bytes or bits, an amount of data above the IP layer, and actual data above the IP layer, pending at the first base station 206 for the service session.

It was mentioned above that the second data amount indication M2 may be equal or different to the first data amount indication M1, and some non-limiting examples 1-7 of how M2 and M1 may be related in more detail will now be described, also further exemplifying the above embodiments of data amount indication.

1) M1=actual data above the IP layer, M2=number of TCP segments or number of Protocol Data Unit PDUs at the transport protocol layer.

2) M1=actual data above the IP layer, M2=number of bytes or bits.

3) M1=number of IP packets, M2=number of TCP segments or number of PDUs at the transport protocol layer. In this example, the source service node is able to translate from the number of IP packets pending in the downlink buffer to a number of corresponding TCP segments or transport layer protocol PDUs.

4) M1=number of bytes or bits above the IP layer, M2=number of TCP segments or number of PDUs at the transport protocol layer. In this example, the source service node is able to translate from the number of bytes or bits pending in the downlink buffer to a number of TCP segments or transport layer protocol PDUs.

5) M1=number of bytes or bits at the IP layer, M2=number of TCP segments or number of PDUs at the transport protocol layer. In this example, the source service node is able to translate from the number of bytes or bits pending in the downlink buffer to number of TCP segments/ transport layer protocol PDUs).

6) M1=number of bytes at the IP layer, M2=number of IP packets In this example, the source service node is able to translate from number of bytes or bits pending in the downlink buffer to number of TCP segments/transport layer protocol PDUs.

7) M1=number of TCP segments or number of PDUs at the transport protocol layer, M2=number of TCP segments or number of PDUs at the transport protocol layer.

In any of the above examples, the number of TCP segments or transport layer protocol PDUs may include partial TCP segments or transport layer protocol PDUs as well. Furthermore, in any of the above examples where M1 does not consist of actual downlink data extracted from the downlink buffer, M2 may be comprised of a simple parameter that indicates the same as M1, i.e. when M2 is equal to M1.

In another example embodiment, the service session may involve multiple data flows from the service application to the wireless device 204, and in that case the above-described procedure in FIG. 3 may be performed per data flow. In further example embodiments, the application buffer 200A at the source service node 200 may be a TCP buffer, and the first data amount indication M1 may be obtained from a Packet Data Convergence Protocol, PDCP, layer or a Radio Link Control, RLC, layer at the first base station 206. In another example embodiment, the source service node 200 may be deployed as an LSC which may have a dedicated communication link to the first base station 206 or may be integrated with or co-located with the first base station 206.

An example will now be described, with reference to the flow chart in FIG. 4, of how the solution can be employed in terms of actions performed in a target service node, such as the above-described target service node 202, when a source service node basically operates according to the procedure of FIG. 3. Reference will again be made, without limiting the features described, to the example scenario shown in FIG. 2. The target service node 202 in this procedure is operative for transferring a service session of a wireless device 204 from a source service node 200 to the target service node 202 when a service application is executed in the source service node 200 for the wireless device 204 by means of said service session. It is assumed that the source service node 200 operates according to the procedure of FIG. 3.

A first action 400 illustrates that the target service node 202 detects that the wireless device 204 will be handed over from a first base station 206 associated with the source service node 200 to a second base station 208 associated with the target service node 202. Similar to action 300 of FIG. 3 above, this detection may be achieved by receiving a suitable handover notification or the like from the second base station 208.

In a next action 402, the target service node 202 receives from the source service node 200 application data from an application buffer 200A at the source service node 200 and a data amount indication M2 related to an amount of downlink data previously pending in but now deleted from a downlink buffer 206A at the first base station 206 for the service session. This action thus corresponds to actions 2:4 and 306 in FIGS. 2 and 3, respectively. The above-mentioned data amount indication M2 corresponds to the above-described second data amount indication M2. It was described above for FIG. 3 how M2 can be derived from M1 and sent by the source service node 200 together with the application data. The data amount indication M2 received in action 402 is thus related to pending downlink data which will not be transferred to the second base station 208 on the radio transport layer, since the first base station 206 was requested to delete at least some of it from its downlink buffer 206A, as described above for action 304.

An example could be that the target service node 202 detects the forthcoming handover by receiving an indication in a message from the source service node 200, thus preceding the transfer of M2 and buffered application data from the source service node 200 to the target service node 202. Another example could be that there is no explicit notification—at least none in advance—and that the target service node 202 detects the handover by receiving M2 and buffered application data from the source service node 200.

In a further action 404, the target service node 202 recreates the downlink buffer 208A at the second base station 208 by sending a first part of the received application data which corresponds to the data amount indication M2, to the second base station 208. A final action 406 illustrates that the target service node 202 resumes the service session by sending a not yet sent part of the received application data to the second base station 208 for transmission to the wireless device 204. Actions 404 and 406 correspond to actions 2:6 and 2:7, respectively, in FIG. 2. If the service session involves multiple data flows, the recreation of the downlink buffer and resuming of service session may be performed for all data flows together, e.g. jointly in a single integrated operation.

Figure 4:
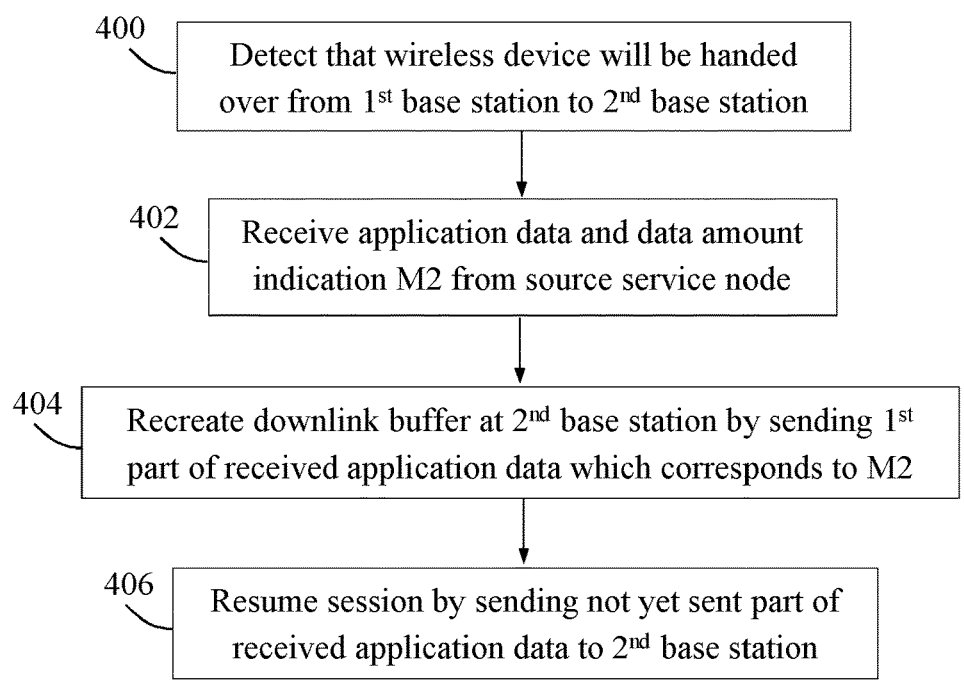
FIG. 4 is a flow chart illustrating a procedure in a target service node, according to further possible embodiments.

Some further embodiments and examples of how the above procedure in FIG. 4 may be realized will now be further outlined. In one example embodiment, said first part of the application data used for recreating the downlink buffer 208A may comprise application data that has been sent from the source service node 200 to the first base station 206 which data is not yet acknowledged by the wireless device 204. Further, any transmitted and unacknowledged downlink data will also be included in the recreated downlink buffer 208A at the second base station 208 since it may need to be retransmitted to the wireless device 204 in case no acknowledgement is received therefrom.

In another example embodiment, said first part of the application data may comprise new unacknowledged application data in the application buffer 200A at the source service node 200 that has been sent from the source service node 200 later than a second part of unacknowledged application data in the application buffer 200A. Hence, the first part of application data corresponds to the downlink data that was deleted by the first base station, which accordingly is "earlier" than the not yet sent application data but "later" than the older second part of unacknowledged application data.

In further example embodiments, the data amount indication M2 received from the source service node 200 may indicate at least one of: a number of IP packets, a number of Transmission Control Protocol TCP segments, a number of bytes or bits, an amount of data above the IP layer, and actual data above the IP layer, pending at the first base station 206 for the service session. In another example embodiment, the service session may involve multiple data flows from the service application to the wireless device 204, and in that case the procedure of FIG. 4 may be performed per data flow.

In further example embodiments, the application buffer 200A at the source service node 200 may be a TCP buffer, and the data amount indication M2 may be derived from, possibly equal to, data amount information obtained from a Packet Data Convergence Protocol, PDCP, layer or a Radio Link Control, RLC, layer at the first base station 206. In another example embodiment, the target service node 202 may, similar to the source service node 200, be deployed as an LSC having a dedicated communication link to the second base station 208 or being integrated with or co-located with the second base station 208.

It was mentioned above that the source service node 200 requests the first base station 206 to delete some or all pending downlink data from its downlink buffer 206A, and that the target service node 202 then recreates the downlink buffer 208A by sending a first part of the received application data according to the data amount indication M2 to the second base station 208. An example of how this can be implemented will now be described in more detail with reference to the diagram in FIG. 5, and occasionally also with reference to the nodes and elements illustrated in FIG. 2.

Figure 5:
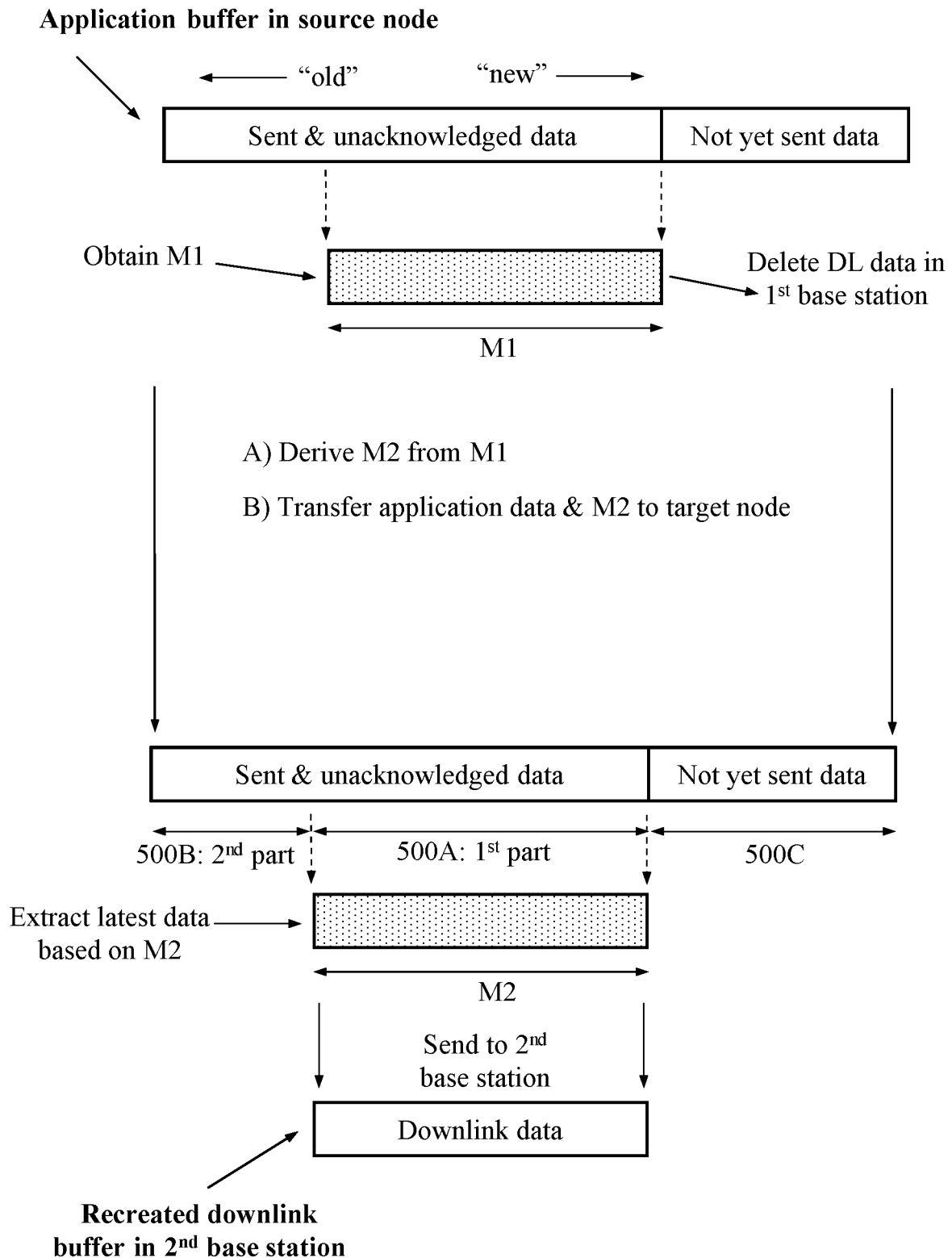
FIG. 5 is a diagram illustrating how a downlink buffer can be recreated when the solution is used, according to further possible embodiments.

At the top of FIG. 5, the application buffer 200A at the source service node 200 is comprised of sent and unacknowledged application data and not yet sent application data. In this application buffer 200A, old data is indicated to the left while new data is indicated to the right so that the buffer is built by adding the latest generated data on the right side of the buffer while acknowledged application data is removed on the left side of the buffer. The above-described request for deletion of downlink data of action 304 is made by obtaining the first data amount indication M1 which in this example refers to a part of the unacknowledged sent application data in the application buffer 200A, i.e. the latest or most recent "new" unacknowledged sent data, which thus corresponds to the data deleted from the downlink buffer 206A.

An operation A) indicates that the source service node 200 derives the above-described second data amount indication M2 from the first data amount indication M1, e.g. based on a predefined relation between M1 and M2. Another operation B) indicates that the source service node 200 then transfers its pending application data, including the unacknowledged sent data and the not yet sent data, together with M2 to the target service node 202, which corresponds to actions 306 and 402.

The target service node 202 then performs the above-described recreation of the downlink buffer 208A at the second base station 208 as of action 404 by extracting a first part 500A of the received application data that corresponds to the received data amount indication M/M2, and sending said first part 500A to the second base station 208, as illustrated at the bottom of FIG. 5. The first part 500A of the application data thus comprises new unacknowledged application data in the application buffer 200A at the source service node 200 that has been sent from the source service node 200 later than a second part 500B of unacknowledged application data. The not yet sent part of the received application data is denoted 500C.

Thereby, the downlink buffer 208A at the second base station 208 will mirror the downlink buffer 206A at the first base station 206 so that no pending downlink data will be lost when resuming the service session after the handover is completed, including transmitting the pending downlink data to the wireless device 204 from the second base station 208. The target service node 202 also resumes the service session by sending the not yet sent part 500C of the received application data to the second base station 208 for transmission to the wireless device 204.

Figure 6:
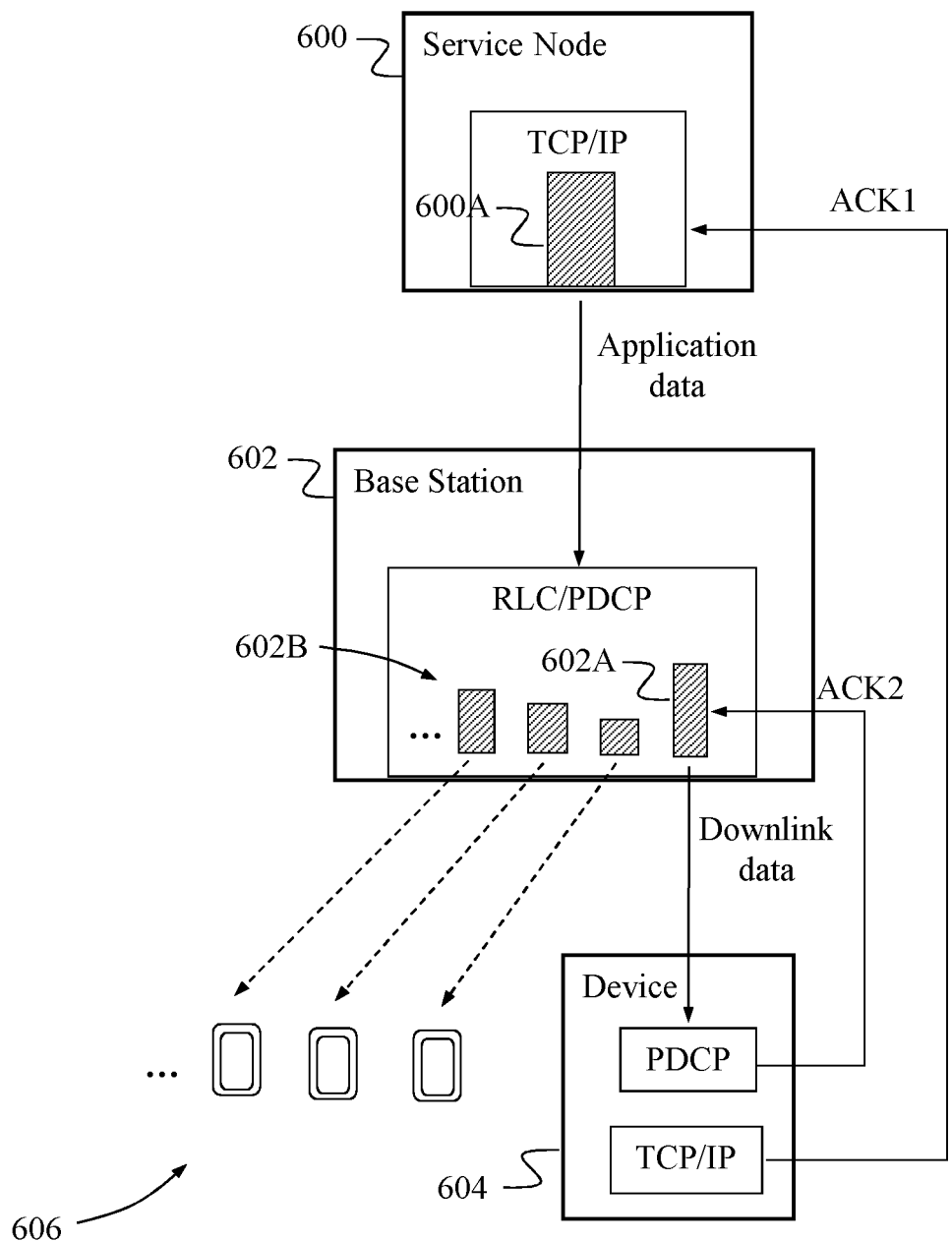
FIG. 6 is a block diagram illustrating how a service node and a base station may operate when the solution is used, according to further possible embodiments.

An example of how a service node and a base station may generally operate when the solution is used, will now be briefly outlined with reference to the block diagram FIG. 6. The service node 600 may be either of the above-described source and target service nodes 200, 202, while the base station 602 may be either of the above-described first and second base stations 206, 208, respectively. The service node 600 generates or otherwise obtains application data for a wireless device 604 which data is kept in an application buffer 600A. In this non-limiting example, the TCP/IP protocol is used in the communication of application data from the service node 600, and the application buffer 600A is a TCP buffer.

The application data in the buffer 600A is gradually sent to the base station 602 for subsequent wireless transmission to device 604 according to regular procedures. In the base station 602, the received application data is arranged in a downlink buffer 602A to be gradually transmitted in the form of downlink data to the wireless device 604. FIG. 6 illustrates that the base station 602 may maintain multiple such downlink buffers for a plurality of corresponding wireless devices 606. In this non-limiting example, the PDCP protocol is used in the communication of downlink data from the base station 602.

The wireless device 604 employs a feedback mechanism on two levels, including the PDCP level acknowledging correct reception of downlink data, "ACK1", from the base station 602, and the TCP/IP level acknowledging correct reception of application data, "ACK2", from the service node 600. As said above, the data needs to be kept in either buffer 600A, 602A until it has been sent/transmitted and positively acknowledged by the wireless device 604 through the respective feedback mechanism. The feedback mechanisms described above may be employed in any conventional manner which is somewhat outside the embodiments herein.

Figure 7:
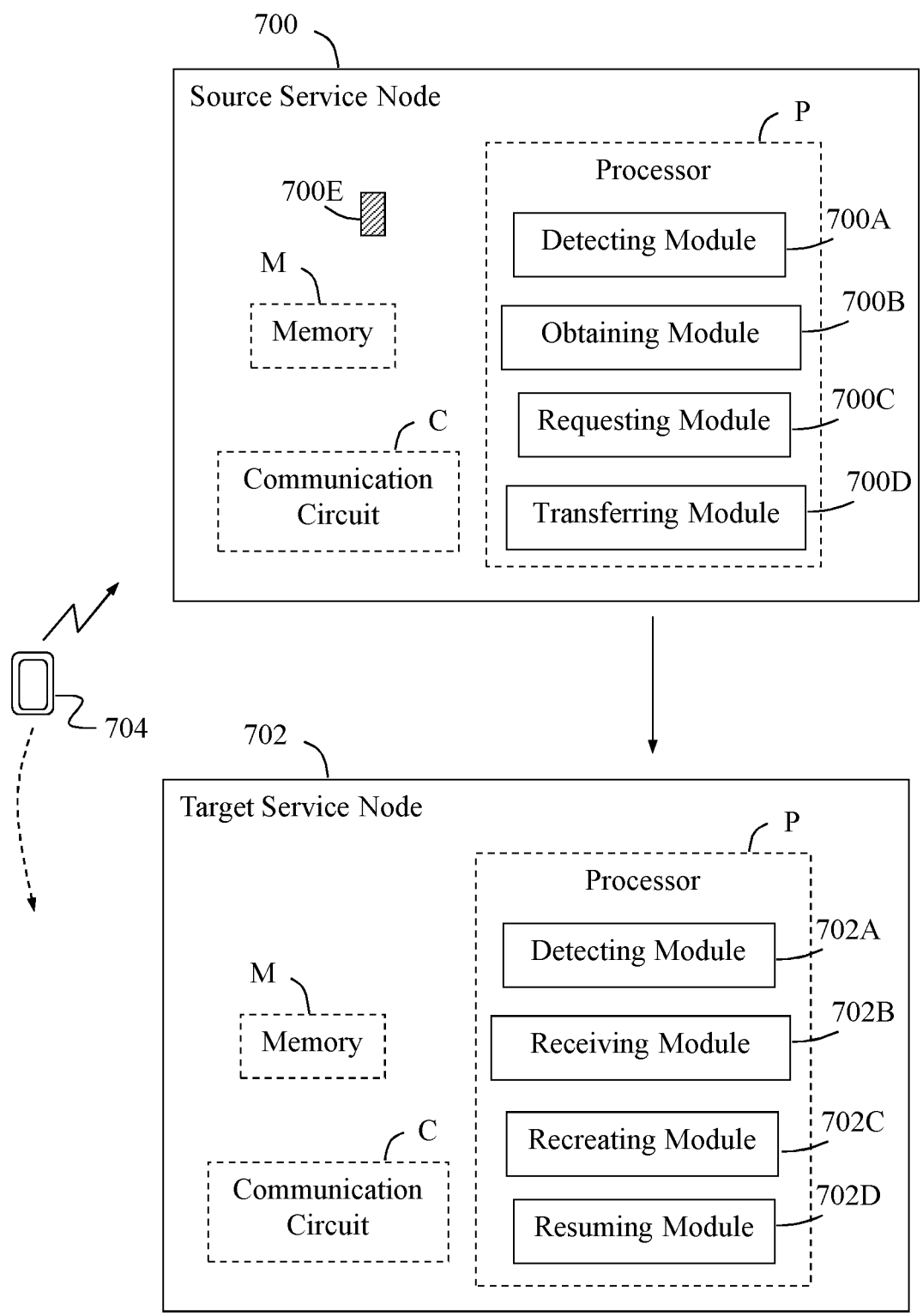
FIG. 7 is a block diagram illustrating a source service node and a target service node in more detail, according to further possible embodiments.

The block diagram in FIG. 7 illustrates a detailed but non-limiting example of how a source service node 700 and a target service node 702, respectively, may be structured to bring about the above-described solution and embodiments thereof. In this figure, the source service node 700 and the target service node 702 may be configured to operate according to any of the examples and embodiments of employing the solution as described herein, where appropriate. Each of the source service node 700 and the target service node 702 is shown to comprise a processor "P", a memory "M" and a communication circuit "C" with suitable equipment for sending and receiving data and information in the manner described herein.

The communication circuit C in each of the source service node 700 and the target service node 702 thus comprises equipment configured for communication with each other and with their associated base stations using suitable protocols for the communication depending on the implementation. The solution is however not limited to any specific types of messages or protocols. As a practical but non-limiting example, the data and information described herein may be communicated by means of the Hyper Text Transfer Protocol, HTTP, or the File Transfer Protocol, FTP.

The source service node 700 is, e.g. by means of modules, units or the like, configured or arranged to perform at least some of the actions of the flow chart in FIG. 3 as follows. Further, the target service node 702 is, e.g. by means of modules, units or the like, operative or arranged to perform at least some of the actions of the flow chart in FIG. 4 as follows.

The source service node 700 is arranged to transfer a service session for a wireless device 704 from the source service node 700 to a target service node 702 when a service application is executed in the source service node 700 for the wireless device 704 by means of said service session. The source service node 700 comprises a memory M and a processor P, the memory M containing instructions executable by the processor P such that the source service node 700 is operative as follows.

The source service node 700 is configured to detect that the wireless device 704 will be handed over from a first base station associated with the source service node 700 to a second base station associated with the target service node 702. This operation may be performed by a detecting module 700A in the source service node 700, as described above for action 300. The first and second base stations are not shown in this figure for simplicity.

The source service node 700 is further configured to obtain from the first base station a first data amount indication M1 indicating an amount of downlink data pending in a downlink buffer at the first base station for the service session. This operation may be performed by an obtaining module 700B in the source service node 700, as described above for action 302. The obtaining module 700B could alternatively be named a fetching module or a retrieving module.

The source service node 700 is further configured to request the first base station to delete at least some of said amount of pending downlink data from the downlink buffer in the first base station. This operation may be performed by a requesting module 700C in the source service node 700, as described above for action 304. The requesting module 700C could alternatively be named a buffer control module.

The source service node 700 is further configured to transfer to the target service node 702 application data from an application buffer 700E at the source service node 700 and a second data amount indication M2 related to the first data amount indication M1. Thereby, the target service node 702 is enabled to recreate the downlink buffer at the second base station by sending a first part of the application data, i.e. part 500A in FIG. 5, which corresponds to the second data amount indication M2, to the second base station. This operation may be performed by a transferring module 700D in the source service node 700, as described above for action 306. The transferring module 700D could alternatively be named a migrating module or a handover module.

The target service node 702 is arranged to transfer a service session for a wireless device 704 from a source service node 700 to the target service node 702 when a service application is executed in the source service node 700 for the wireless device 704 by means of said service session. The target service node 702 comprises a memory M and a processor P, the memory M containing instructions executable by the processor P such that the target service node 702 is operative as follows.

The target service node 702 is configured to detect that the wireless device 704 will be handed over from a first base station associated with the source service node 700 to a second base station associated with the target service node 702. This operation may be performed by a detecting module 702A in the target service node 702, as described above for action 400.

The target service node 702 is further configured to receive from the source service node 700 application data from an application buffer 700E at the source service node 700 and a data amount indication M2 related to an amount of downlink data pending in a downlink buffer at the first base station for the service session. This operation may be performed by a receiving module 702B in the target service node 702, as described above for action 402. The receiving module 702B could alternatively be named a migrating module or a handover module.

The target service node 702 is further configured to recreate the downlink buffer at the second base station by sending a first part of the received application data which corresponds to the data amount indication M2 to the second base station. This operation may be performed by an recreating module 702C in the target service node 702, as described above for action 404. The recreating module 702C could alternatively be named a buffer module.

The target service node 702 is further configured to resume the service session by sending a not yet sent part of the received application data, i.e. part 500C in FIG. 5, to the second base station for transmission to the wireless device. This operation may be performed by a resuming module 702D in the target service node 702, as described above for action 408. The resuming module 702E could alternatively be named a session module.

Figure 7A:
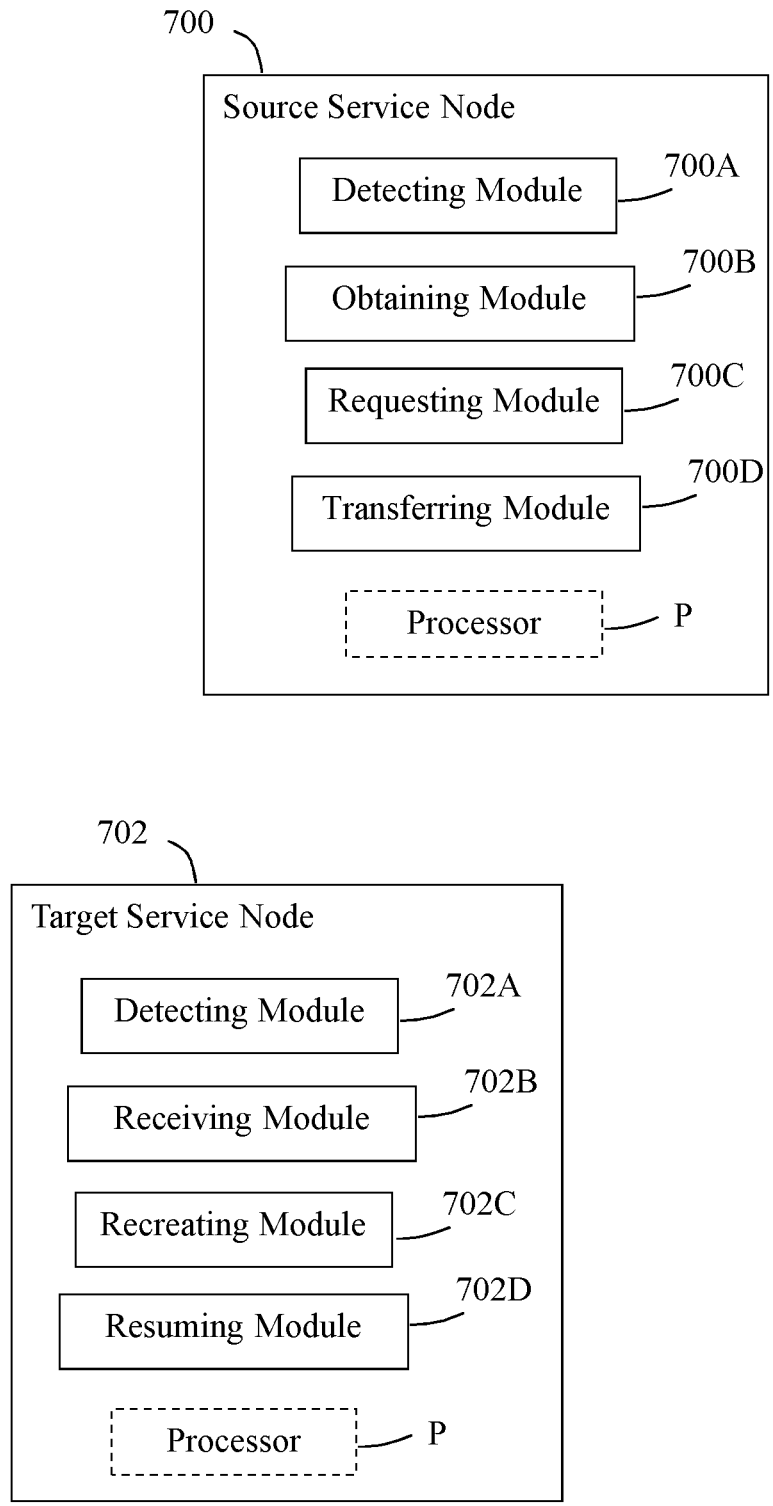
FIG. 7A is a block diagram illustrating another example of how a source service node and a target service node may be configured, according to further possible embodiments.

Another example of how the source service node 700 and the target service node 702 may be configured is schematically shown in the block diagram of FIG. 7A. In this example, the first network node 700 comprises the functional modules 700A-700D and a processor P, the modules 700A-700E being configured to operate in the manner described above with reference to FIGS. 2 and 3. Further, the target service node 702 comprises the functional modules 702A-702B and a processor P, the modules 702A-702B being configured to operate in the manner described above with reference to FIGS. 2 and 4.

It should be noted that FIGS. 7 and 7A illustrate various functional modules in the source service node 700 and the target service node 702, respectively, and the skilled person is able to implement these functional modules in practice using suitable software and hardware equipment. Thus, the solution is generally not limited to the shown structures of the source service node 700 and the target service node 702, and the functional modules therein may be configured to operate according to any of the features, examples and embodiments described in this disclosure, where appropriate.

The functional modules 700A-D and 702A-D described above may be implemented in the source service node 700 and the target service node 702, respectively, by means of program modules of a respective computer program comprising code means which, when run by the processor P causes the source service node 700 and the target service node 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the source service node 700 and the target service node 702 in the form of a memory having a computer readable medium and being connected to the processor P. The computer program product or memory M in each of the source service node 700 and the target service node 702 thus comprises a computer readable medium on which the computer program is stored e.g. in the form of computer program modules or the like. For example, the memory M in each node 700, 702 may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective source service node 700 and target service node 702.

The solution described herein may be implemented in each of the source service node 700 and the target service node 702 by a computer program comprising instructions which, when executed on at least one processor, cause the at least one processor to carry out the actions according to any of the above embodiments and examples, where appropriate. The solution may also be implemented at each of the source service node 700 and the target service node 702 in a computer readable storage medium comprising instructions which, when executed on the source service node 700 and the target service node 702, cause the source service node 700 and the target service node 702 to carry out the actions according to the above respective embodiments, where appropriate.

Some further examples of how the above-described solution and embodiments may be implemented in practice, will now be outlined.

The PDCP protocol delivers packets to the RLC protocol which is responsible for reliable, in sequence delivery of packets between a base station, or eNodeB, and wireless devices. As part of its functionality, RLC employs a selective retransmission based mechanism for reliable transfer of data to the wireless device, generally referred to as ARQ, which implies use of buffers to store packets until they have been reliably transmitted, i.e. acknowledged by the device.

When a wireless device is handed over from one base station to another, the contents of the buffer in PDCP related to the wireless device also needs to be transferred between the base stations to ensure continuity of the PDCP protocol. The transfer of the PDCP buffers, among other things, is typically done over the X2 interface between the two base stations involved.

The data in the PDCP buffers are a subset of data in the TCP buffers of the service node, or LSC, where the application hosting the service session is located. When a wireless device moves from one base station to another, the service context along with TCP buffers and the PDCP buffer have to be migrated as well to ensure continuity in the service for the wireless device.

By employing one or more of the embodiments herein, it may be possible to optimize the amount of data to be transferred between base stations and service nodes when a wireless device moves from one base station to another.

To enable this optimization it has thus been realized that some data is duplicated in the TCP buffers, i.e. from the unacknowledged sent part as described above, and the PDCP buffer, i.e. redundant data is migrated when the complete TCP/IP and PDCP buffers are transferred.

The above-described solution for buffer optimization can be triggered when a wireless device needs to be handed over from one base station to another such that transfer of service sessions for the wireless device in the service node is required.

It was mentioned above that a service session may involve multiple data flows from the service application to the wireless device. Also, several data flows may be handled for multiple wireless devices in parallel, as shown in FIG. 6. The following details may further be useful to consider in the above-described solution and its embodiments:

A PDCP component of the base station may be used to identify individual data flows that belong to a wireless device and it is helpful to maintain a counter to the amount of buffer data related to each flow that is handled by means of the PDCP buffers. In this context, a flow may be associated with a bearer, e.g. a so-called Evolved Packet System, EPS, bearer and/or a radio bearer.

The base station should be able to provide an interface that allows the service node to request for the amount of data in the PDCP buffer belonging to a flow.

The above-mentioned amount of data can be calculated as one of: A) the number of bytes of user data which can be calculated based on a sequence number, B) the number of IP packets e.g. by counting the number of IP frames received from the LSC, or C) the number of TCP segments e.g. based on the TCP header boundaries inside a TCP packet.

The base station should also be able to provide an interface from which the service node can query and obtain the PDCP (i.e. downlink) buffers belonging to a flow. The target source node is then able to use this interface of the second base station to restore the downlink buffer content at the second base station. For the PDCH entity, i.e. the downlink buffer, in the second base station, this data will appear just like any downlink data arriving from the associated service node. Hence, no modifications would be needed for the regular base station and its interface towards the service node, for reception of downlink data from the LSC.

A data flow is typically defined as a simple "5-tuple" that indicates Source IP address, Source Port, Destination IP address, Destination Port, and UE context reference. The UE context reference may be a so-called eNB UE S1AP ID, the wireless device's identifier IMSI or S-TMSI, or an internal implementation specific identifier or pointer. The flow may also be indicated by any other entity that can individually identify a data flow between service node and wireless device.

As mentioned above, the indication of the amount of data in the PDCP (downlink) buffer that the base station/PDCP entity has received from its associated service node may be realize in different ways. The above-described second data amount indication should ideally provide the target source node with the information it needs to be able to replace exactly the bytes or bits that are removed from the PDCP buffer when it recreates the PDCP buffer content at the second base station. That is, the target source node must be able to identify the data in the "sent unacknowledged" part of the TCP buffer that is duplicated in the PDCP buffer for a certain flow. An example of how this could be done has been described above with reference to FIG. 5.

However, achieving this goal may be complicated by a number of circumstances, such as addition of PDCP headers, ciphering of PDCP packets, possible IP header compression at the PDCP layer and TCP non-awareness in the PDCP entity.

The following list of what the data amount indication could represent and how to make it work, should be seen as illustrative but non-limiting examples, at least when considering realistic and reasonably workable ways. In the following, a service node is referred to as LSC and a base station is represented by the term "PDCP entity" which is a component in the base station for communication according to the PDCP.

The number of IP packets. The PDCP entity can let the data amount indication represent the number of IP packets. The PDCP layer is fed with IP packets from the LSC, which assumedly makes it IP aware, which in turn enables this option. Another prerequisite may be that the LSC is able to "backtrack" from (number of) IP packets to TCP segments (including partial segments), which is what is stored in the TCP buffer.

The number of TCP segments, or the TCP sequence number. The PDCP entity could let the data amount indication represent the number of TCP segments (or the TCP sequence number). This requires that the PDCP entity is made "TCP aware", i.e. able to read TCP headers.

The amount of data, e.g. in number of bytes, as seen above the IP layer. The PDCP entity can let the data amount indication represent the number of bytes that represents the data on the layer above the IP layer, i.e. typically at the TCP layer. To enable this, the PDCP entity should be able to extract non-ciphered and uncompressed data without PDCP headers and can further remove the IP headers from this data. The number of bytes contained in the remaining data is what the data amount indicator represents. Since this data represents the TCP layer data, the LSC can see how many full and/or partial TCP segments the indicated data amount maps to in its buffer.

The actual data above the IP layer. The PDCP entity can let the actual data above the IP layer, i.e. assumedly at the TCP layer, represent the data amount indication. To enable this, the PDCP entity should be able to extract non-ciphered and uncompressed data without PDCP headers and can further remove the IP headers from this data. The remaining data is then transferred to the LSC, e.g. letting the data itself represent the data amount indication. The LSC then "analyzes" this data to see how many TCP segments and/or partial segments it contains and maps this on the duplicated content in the "sent unacknowledged" part of the TCP buffer. It should be noted that with this option the data amount indication is formed by the actual data—not just the size of it. It should however be noted that it is the derived number of TCP segments that is transferred from the source LSC to the new LSC—not the actual data received from the PDCP entity. This alternative may be generalized to cover also other transport layer protocols than TCP, e.g. SCTP or QUIC, could be to state that the source LSC analyzes the data received from the PDCP entity and determines the number of (full and partial) transport layer protocol data units, i.e. the number of PDUs at the transport layer, that the received data contains and maps this on the duplicated content in the "sent unacknowledged" part of the transport layer protocol buffer. Yet another alternative could be that the source LSC only counts the number of bytes in the data received from the PDCP entity and transfers this number to the new LSC.

In an alternative embodiment, the TCP data yet to be acknowledged by the wireless device may be buffered also in the RLC layer. In this embodiment, the LSC may retrieve buffer size information from the RLC layer instead of the PDCP layer.

While the solution has been described with reference to specific exemplifying embodiments, the description is generally only intended to illustrate the inventive concept and should not be taken as limiting the scope of the solution. For example, the terms "source service node", "target service node", "wireless device", "base station", "service session", "application data", "application buffer", "downlink data", "downlink buffer" and "data amount indication" have been used throughout this disclosure, although any other corresponding entities, functions, and/or parameters could also be used having the features and characteristics described here. The solution is defined by the appended claims.

The invention claimed is:

1. A method performed by a source service node for transferring a service session for a wireless device from the source service node to a target service node when a service application is executed in the source service node for the wireless device using the service session, the method comprising:
   detecting that the wireless device will be handed over from a first base station associated with the source service node to a second base station associated with the target service node,
   obtaining from the first base station a first data amount indication indicating an amount of downlink data pending in a downlink buffer at the first base station for the service session,
   requesting the first base station to delete at least some of the amount of pending downlink data from the downlink buffer in the first base station, and
   transferring to the target service node buffered application data from an application buffer at the source service node and a second data amount indication related to the first data amount indication, thereby allowing the target service node to recreate the downlink buffer at the second base station by sending a first part of the application data, which corresponds to the second data amount indication to the second base station.

2. The method according to claim 1, wherein the first part of the application data comprises application data that has been sent from the source service node but is not yet acknowledged by the wireless device.

3. The method according to claim 1, wherein the first part of the application data comprises new unacknowledged application data in the application buffer at the source service node that has been sent from the source service node later than a second part of the application data in the application buffer that is not yet acknowledged.

4. The method according to claim 1, wherein the downlink data pending at the first base station comprises downlink data that has not yet been transmitted to the wireless device and downlink data that has been transmitted to the wireless device but is not yet acknowledged.

5. The method according to claim 1, wherein either of the first and second data amount indications indicates at least one of: a number of IP packets, a number of Transmission Control Protocol (TCP) segments, and a number of bytes or bits for an amount of data above the Internet Protocol (IP) layer pending at the first base station for the service session and actual data above the IP layer pending at the first base station for the service session.

6. The method according to claim 1, wherein the service session involves multiple data flows from the service application to the wireless device, and
wherein the method is performed per data flow.

7. The method according to claim 1, wherein the application buffer at the source service node is a TCP buffer,
wherein the first data amount indication is obtained from a Packet Data Convergence Protocol (PDCP) layer or a Radio Link Control (RLC) layer at the first base station, and
wherein the source service node is deployed as a Local Service Cloud (LSC) having a dedicated communication link to the first base station or being integrated with or co-located with the first base station.

8. A source service node arranged to transfer a service session for a wireless device from the source service node to a target service node when a service application is executed in the source service node for the wireless device by using the service session, wherein the source service node is configured to:
detect that the wireless device will be handed over from a first base station associated with the source service node to a second base station associated with the target service node,
obtain from the first base station a first data amount indication indicating an amount of downlink data pending in a downlink buffer at the first base station for the service session,
request the first base station to delete at least some of said amount of pending downlink data from the downlink buffer in the first base station, and
transfer to the target service node application data from an application buffer at the source service node and a second data amount indication related to the first data amount indication, thereby allowing the target service node to recreate the downlink buffer at the second base station by sending a first part of the application data which corresponds to the second data amount indication to the second base station.

9. The source service node according to claim 8, wherein the first part of the application data comprises application data that has been sent from the source service node but is not yet acknowledged by the wireless device.

10. The source service node according to claim 8, wherein the first part of the application data comprises new unacknowledged application data in the application buffer at the source service node that has been sent from the source service node later than a second part of the application data in the application buffer that is not yet.

11. The source service node according to claim 8, wherein the downlink data pending at the first base station comprises downlink data that has not yet been transmitted to the wireless device and downlink data that has been transmitted to the wireless device but is not yet acknowledged.

12. The source service node according to claim 8, wherein either of the first and second data amount indications indicates at least one of: a number of Internet Protocol (IP) packets, a number of Transmission Control Protocol (TCP) segments, and a number of bytes or bits for an amount of data above the IP layer pending at the first base station for the service session and actual data above the IP layer pending at the first base station for the service session.

13. The source service node according to claim 8, wherein the service session involves multiple data flows from the service application to the wireless device, and
wherein the source service node is configured to operate per data flow.

14. The source service node according to claim 8, wherein the application buffer at the source service node is a TCP buffer,
wherein the first data amount indication is obtainable from a Packet Data Convergence Protocol (PDCP) layer or a Radio Link Control (RLC) layer at the first base station (206), and
wherein the source service node is deployable as a Local Service Cloud (LSC) having a dedicated communication link to the first base station or being integrated with or co-located with the first base station.

15. A method performed by a target service node for transferring a service session for a wireless device from a source service node to the target service node when a service application is executed in the source service node for the wireless device using the service session, the method comprising:
detecting that the wireless device will be handed over from a first base station associated with the source service node to a second base station associated with the target service node,
receiving from the source service node buffered application data from an application buffer at the source service node and a data amount indication related to an amount of downlink data pending in a downlink buffer at the first base station for the service session,
recreating the downlink buffer at the second base station by sending a first part of the received application data, which corresponds to the data amount indication, to the second base station, and
resuming the service session by sending a not yet sent part of the received application data to the second base station for transmission to the wireless device.

16. The method according to claim 15, wherein the first part of the received application data comprises application data that has been sent from the source service node but is not yet acknowledged by the wireless device.

17. The method according to claim 15, wherein the first part of the received application data comprises new unacknowledged application data in the application buffer at the source service node that has been sent from the source service node later than a second part of the application data in the application buffer that is not yet acknowledged.

18. The method according to claim 15, wherein the data amount indication received from the source service node indicates at least one of: a number of IP packets, a number of Transmission Control Protocol (TCP) segments, and a number of bytes or bits for an amount of data above the Internet Protocol (IP) layer pending at the first base station for the service session and actual data above the IP layer pending at the first base station for the service session.

19. The method according to claim 15, wherein the service session involves multiple data flows from the service application to the wireless device, and
wherein the method is performed per data flow.

20. The method according to claim 15, wherein the application buffer at the source service node is a TCP buffer,
wherein the data amount indication is obtained from a Packet Data Convergence Protocol (PDCP) layer or a Radio Link Control (RLC) layer at the first base station, and
wherein the target service node is deployed as a Local Service Cloud (LSC) having a dedicated communication link to the second base station or being integrated with or co-located with the second base station.

21. A target service node arranged to transfer a service session for a wireless device from a source service node to the target service node when a service application is executed in the source service node for the wireless device using the service session, wherein the target service node is configured to:
- detect that the wireless device will be handed over from a first base station associated with the source service node to a second base station associated with the target service node,
- receive from the source service node application data from an application buffer at the source service node and a data amount indication related to an amount of downlink data pending in a downlink buffer at the first base station for the service session,
- recreate the downlink buffer at the second base station by sending a first part of the received application data, which corresponds to the data amount indication, to the second base station, and
- resume the service session by sending a not yet sent part of the received application data to the second base station for transmission to the wireless device.

22. The target service node according to claim 21, wherein the first part of the received application data comprises application data that has been sent from the source service node but is not yet acknowledged by the wireless device.

23. The target service node according to claim 21, wherein said first part of the received application data comprises new unacknowledged application data in the application buffer at the source service node that has been sent from the source service node later than a second part of the application data in the application buffer that is not yet acknowledged.

24. The target service node according to claim 21, wherein the data amount indication received from the source service node indicates at least one of: a number of Internet Protocol (IP) packets, a number of Transmission Control Protocol (TCP) segments, and a number of bytes or bits for an amount of data above the IP layer pending at the first base station for the service session and actual data above the IP layer pending at the first base station for the service session.

25. The target service node according to claim 21, wherein the service session involves multiple data flows from the service application to the wireless device, and wherein the method is performed per data flow.

26. The target service node according to claim 21, wherein the application buffer at the source service node is a TCP buffer,
- wherein the data amount indication is obtained from a Packet Data Convergence Protocol (PDCP) layer or a Radio Link Control (RLC) layer at the first base station, and
- wherein the target service node is deployed as a Local Service Cloud (LSC) having a dedicated communication link to the second base station or being integrated with or co-located with the second base station.

* * * * *